(12) United States Patent
Ishii et al.

(10) Patent No.: US 9,932,080 B2
(45) Date of Patent: Apr. 3, 2018

(54) STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/100,921

(22) PCT Filed: Dec. 2, 2013

(86) PCT No.: PCT/JP2013/007045
§ 371 (c)(1),
(2) Date: Jun. 1, 2016

(87) PCT Pub. No.: WO2015/083193
PCT Pub. Date: Jun. 11, 2015

(65) Prior Publication Data
US 2016/0304145 A1    Oct. 20, 2016

(51) Int. Cl.
*B62J 1/00* (2006.01)
*B62J 1/28* (2006.01)
(Continued)

(52) U.S. Cl.
CPC .............. *B62J 1/005* (2013.01); *B62J 1/007* (2013.01); *B62J 1/02* (2013.01); *B62J 1/28* (2013.01); *B62J 17/00* (2013.01); *B62J 25/00* (2013.01)

(58) Field of Classification Search
CPC ................................ B62J 1/005; B62J 17/00
See application file for complete search history.

(56) References Cited

U.S. PATENT DOCUMENTS

| 4,111,448 A * | 9/1978 | Sklodowsky | B62J 1/28 280/202 |
|---|---|---|---|
| 7,651,112 B2 * | 1/2010 | Ozawa | B62J 1/28 180/219 |

(Continued)

FOREIGN PATENT DOCUMENTS

| CN | 2341874 Y | 10/1999 |
|---|---|---|
| CN | 101423079 A | 5/2009 |

(Continued)

OTHER PUBLICATIONS

ISA Japanese Patent Office, International Search Report Issued in Application No. PCT/JP2013/007045, dated Mar. 4, 2014, WIPO, 4 pages.

(Continued)

*Primary Examiner* — Anne Marie M Boehler
*Assistant Examiner* — Michael R Stabley
(74) *Attorney, Agent, or Firm* — Alleman Hall Creasman & Tuttle LLP

(57) ABSTRACT

A motorcycle comprises a vehicle body frame; a seat mounted to the vehicle body frame and including a seat section on which a rider is seated; and a pair of rear side cowlings which are placed on right and left sides of the seat and mounted to the vehicle body frame, the pair of rear side cowlings including protruding sections, respectively, protruding farther upward than the seat section, when viewed from a side.

4 Claims, 7 Drawing Sheets

(51) Int. Cl.
*B62J 1/02* (2006.01)
*B62J 17/00* (2006.01)
*B62J 25/00* (2006.01)

(56) References Cited

U.S. PATENT DOCUMENTS

| | | | | |
|---|---|---|---|---|
| 7,828,102 B2* | 11/2010 | Yano | ............................ | B62J 1/12 |
| | | | | 180/219 |
| 7,857,341 B2* | 12/2010 | Kobayashi | ............... | B62J 17/00 |
| | | | | 180/219 |
| 8,167,467 B2* | 5/2012 | Iida | ............................ | B62J 6/04 |
| | | | | 362/473 |
| 8,342,724 B2* | 1/2013 | Hotei | .................... | B60Q 1/2607 |
| | | | | 362/473 |
| 8,499,878 B2* | 8/2013 | Yamakura | ................. | B62J 6/005 |
| | | | | 180/219 |
| 2008/0156562 A1* | 7/2008 | Yano | ............................ | B62J 1/12 |
| | | | | 180/219 |
| 2010/0244493 A1* | 9/2010 | Iida | ............................ | B62J 6/04 |
| | | | | 296/193.08 |
| 2012/0193164 A1* | 8/2012 | Nagura | .................... | B62J 35/00 |
| | | | | 180/291 |
| 2012/0199408 A1* | 8/2012 | Hayashi | ................... | B62J 35/00 |
| | | | | 180/219 |
| 2013/0320719 A1* | 12/2013 | Komatsu | ..................... | B62J 1/28 |
| | | | | 297/195.1 |
| 2014/0062058 A1* | 3/2014 | Tsutsui | ........................ | B62J 6/18 |
| | | | | 280/281.1 |
| 2014/0062119 A1* | 3/2014 | Yokouchi | ................. | B62K 19/46 |
| | | | | 296/35.3 |
| 2014/0062120 A1* | 3/2014 | Horiuchi | ................. | B62K 19/46 |
| | | | | 296/37.12 |
| 2014/0092613 A1* | 4/2014 | Maeda | ............. | F02M 35/10013 |
| | | | | 362/476 |
| 2014/0141936 A1* | 5/2014 | Osawa | .................... | F02D 11/02 |
| | | | | 477/203 |
| 2014/0167386 A1* | 6/2014 | Tako | ...................... | B62K 11/02 |
| | | | | 280/288 |
| 2015/0083512 A1* | 3/2015 | Maeda | ..................... | B62J 17/00 |
| | | | | 180/229 |

FOREIGN PATENT DOCUMENTS

| | | |
|---|---|---|
| CN | 102619650 A | 8/2012 |
| EP | 1520748 A1 | 4/2005 |
| EP | 1944226 A1 | 7/2008 |
| JP | S6148892 U1 | 4/1986 |
| JP | H361494 U | 6/1991 |
| JP | 2005119378 A | 5/2005 |
| JP | 2007091022 A | 4/2007 |
| JP | 2010235053 A | 10/2010 |

OTHER PUBLICATIONS

ISA Japan Patent Office, Written Opinion of the International Searching Authority Issued in Application No. PCT/JP2013/007045, dated Mar. 4, 2014, WIPO, 5 pages.

European Patent Office, Extended European Search Report Issued in European Application No. 13898549.4, dated Sep. 6, 2017, Germany, 10 pages.

The State Intellectual Property Office of the People's Republic of China, Office Action Issued in CN Application No. 201380081274.1, dated Nov. 16, 2017, 8 pages. (Submitted with English Translation of Search Report).

* cited by examiner

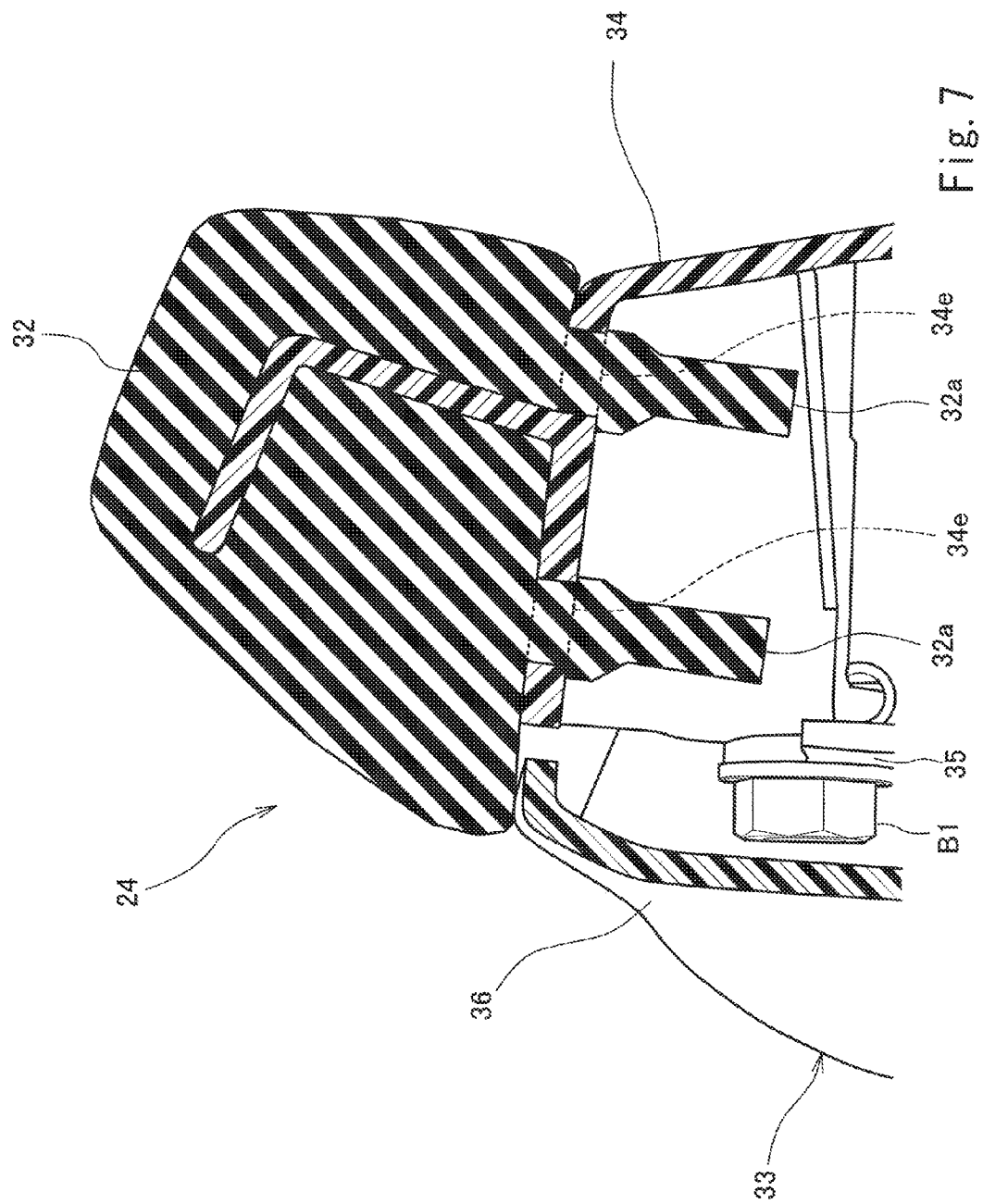

STRADDLE-TYPE VEHICLE

TECHNICAL FIELD

The present invention relates to a straddle-type vehicle which can support a rider straddling the vehicle at an improved level.

BACKGROUND ART

In an exemplary conventional motorcycle, a seat on which a rider is seated is placed behind a fuel tank. To allow the rider to be seated on the seat in a straddle position, the right and left sides of the seat are open. Further, a motorcycle seat is disclosed, which includes side support members for allowing the rider to be well fitted to the right and left sides of the seat to improve comfort (e.g., see Patent Literature 1). In this motorcycle, the seat is extended in a width direction thereof to form the side support members.

CITATION LIST

Patent Literature

Patent Literature 1: Japanese Utility Model Application No. S61-48892

SUMMARY OF INVENTION

Technical Problem

However, in the above-described conventional motorcycle, because of the presence of the support members of the seat, the size of the seat in the width direction increases. In addition, since a seat structure is complicated, manufacturing cost undesirably increases.

Such a problem occurs in all straddle-type vehicles straddled by the rider.

The present invention is directed to solving the above-described problem, and an object of the present invention is to provide a straddle-type vehicle which can support the rider straddling the vehicle at an improved level, while preventing an increase in the size of the support members of the seat on which the rider is seated.

Solution to Problem

To achieve the above-described object, according to a first aspect of the present invention, a straddle-type vehicle comprises a vehicle body frame; a seat mounted to the vehicle body frame and including a seat section on which a rider is seated; and a pair of rear side cowlings which are placed on right and left sides of the seat, respectively, and mounted to the vehicle body frame, the pair of rear side cowlings including protruding sections, respectively, protruding farther upward than the seat section, when viewed from a side.

In accordance with this configuration, since the pair of rear side cowlings include the protruding sections, respectively, protruding farther upward than the seat section, on the right and left sides of the seat, the dimension of the protruding sections in the rightward and leftward direction can be increased while preventing an increase in the width of the vehicle body. Thus, the rider seated on the seat can be supported at an improved level.

Upper portions of the protruding sections may be flexible. In accordance with this configuration, manufacturing cost can be reduced, and the protruding sections can be more easily adapted to the body constitution and posture of the rider, compared to a case where the whole of the protruding sections are flexible. The term "flexible" is defined as having resiliency or a cushioning characteristic, which allows the protruding sections to function as the seat. A portion that is flexible may be referred to as side cushions.

The seat may include a rear cushion placed behind the seat section, and the protruding sections may be placed to be spaced apart from the rear cushion in a rightward and leftward direction.

In accordance with this configuration, the rider's buttocks can be supported from the rear, at three points which are the rear cushion and the right and left protruding sections (side cushions). Thus, the rider's buttocks can be supported at an improved level. In addition, since the area of the cushions can be reduced compared to a case where the rider's buttocks is supported by the whole of the seat, manufacturing cost can be reduced.

A space extending in a forward and rearward direction may be formed between each of the protruding sections and the rear cushion. In accordance with this configuration, the weight of the vehicle can be reduced, and an air resistance can be reduced, because the air flows through the space extending in the forward and rearward direction.

An upper surface of each of the protruding sections may be inclined in an upward direction as the upper surface extends in a rearward direction and each of the protruding sections may be placed in front of the rear cushion and located lower than a lower end of the rear cushion. In accordance with this configuration, the rider's buttocks can be easily supported, at three points which are the rear cushion and the right and left protruding sections (side cushions). In addition, it becomes possible to prevent the rider's buttocks from being overly supported.

A position of each of the protruding sections in a forward and rearward direction may be adjustable. In accordance with this configuration, the rear side cowlings can be easily adapted to the body constitution and driving posture of the rider.

Advantageous Effects of Invention

The present invention is configured as described above, and can achieve the advantage that it is possible to provide a straddle-type vehicle which can support the rider straddling the vehicle at an improved level, while preventing an increase in the size of the support members of the seat on which the rider is seated.

The above and further objects, features, and advantages of the present invention will more fully be apparent from the following detailed description of a preferred embodiment with reference to the accompanying drawings.

BRIEF DESCRIPTION OF DRAWINGS

FIG. 7 is a cross-sectional view of the upper portion of the left rear side cowling, taken along a line VII-VII of FIG. 6.

DESCRIPTION OF EMBODIMENTS

Hereinafter, the embodiment of the present invention will be described with reference to the drawings. The directions stated below are from the perspective of a rider straddling a straddle-type vehicle. In the present embodiment, a motorcycle will be described as an example of the straddle-type vehicle.

Figure 1:
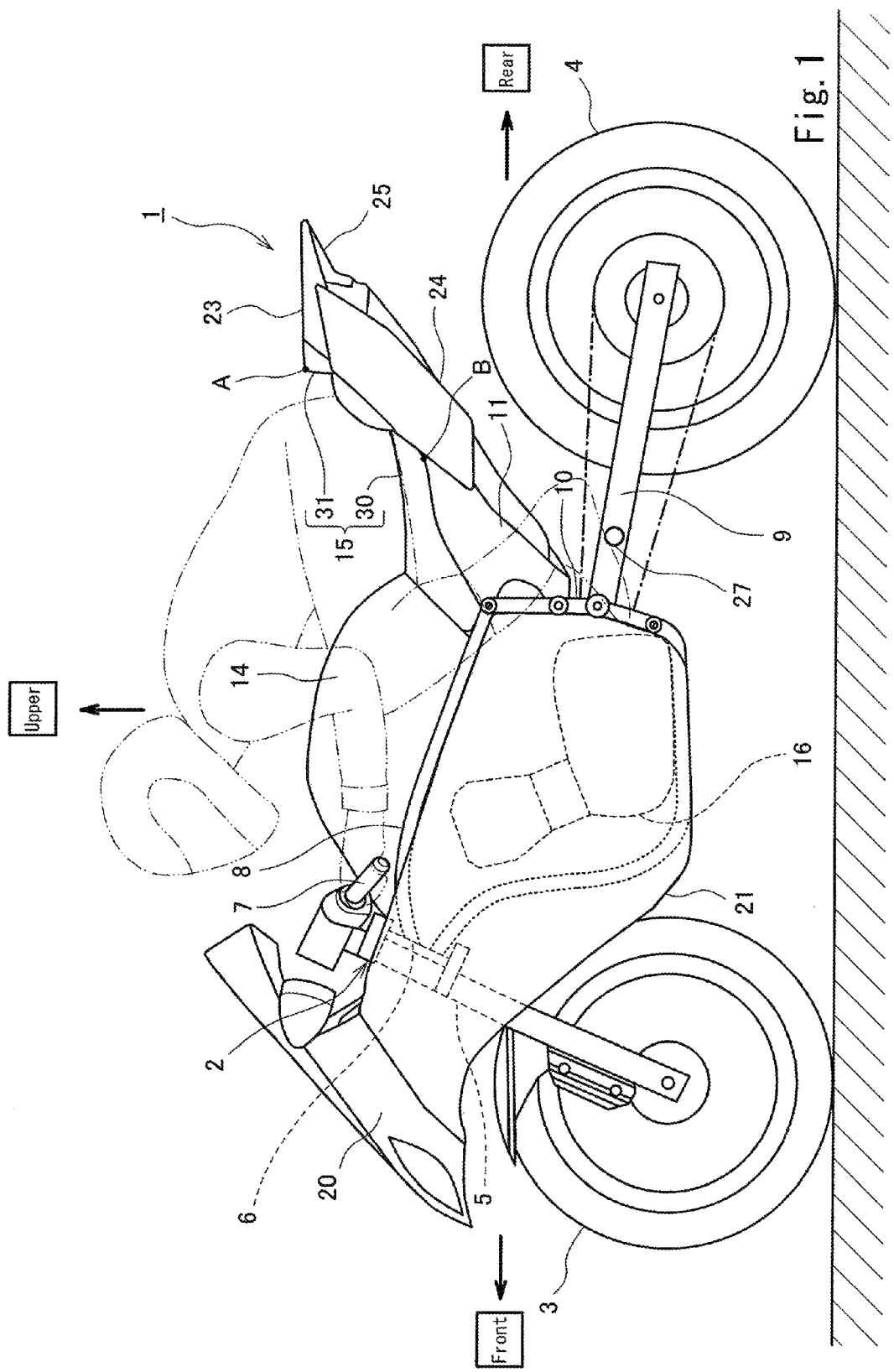
FIG. 1 is a left side view of a motorcycle according to the embodiment of the present invention.

FIG. 1 is a left side view of the motorcycle according to the embodiment of the present invention. As shown in FIG. 1, a motorcycle 1 includes a vehicle body frame 2, a front wheel 3, and a rear wheel 4. The vehicle body frame 2 includes a head pipe 6, a pair of right and left main frames 8 extending rearward from the head pipe 6, a pair of right and left pivot frames 10 which extend from the rear portions of the main frames 8, respectively, and to which the front end portions of a swing arm 9 are mounted in such a manner that the swing arm 9 is pivotable, and a pair of right and left seat rails 11 extending rearward from the pivot frames 10, respectively.

The front wheel 3 is rotatably mounted to the lower end portion of a front fork 5 extending substantially vertically. The front fork 5 is supported by a steering shaft (not shown) via an upper bracket (not shown) provided at the upper end portion of the front fork 5. The steering shaft (not shown) is rotatably supported by the head pipe 6. A bar-type steering handle 7 extending in a rightward and leftward direction is attached to the upper bracket. The rider rotates the steering handle 7 to change the direction of the front wheel 3 into a desired direction around the steering shaft. A fuel tank 14 is placed rearward relative to the steering handle 7 and mounted to the main frames 8. Below the fuel tank 14 and between the front wheel 3 and the rear wheel 4, an engine 16 is mounted to the main frames 8 and the pivot frames 10. Behind the fuel tank 14, a riding seat 15 is mounted to seat rails 11. The seat 15 includes a seat section 30 on which the rider is seated, and a rear cushion 31 placed behind and above the seat section 30 and having a front surface facing the rider's buttocks from the rear. In the present embodiment, a point A indicates the upper portion of the front surface of the rear cushion 31 and points B indicate a portion with a greatest width, of the seat section 30.

In the present embodiment, the motorcycle 1 includes a front cowling 20 covering the front portion of the vehicle body, front side cowlings 21 covering the front portion of the vehicle body from the side, rear side cowlings 24 covering the rear portion of the vehicle body from the side, and a rear cowling 23 covering the rear portion of the vehicle body from above.

The rear side cowlings 24 are mounted to the vehicle body frame 2 to cover the rear portion of the vehicle body from the side. The rear side cowlings 24 are placed on the right and left sides of the riding seat 15. The rear cowling 23 is mounted to the vehicle body frame 2 to cover the rear portion of the vehicle body from above. The rear cowling 23 extends continuously with the rear side cowlings 24 and is located at the rear portion of the seat 15 and a region that is rearward relative to the seat 15. A tail lamp 25 is attached to the rear portion of the rear cowling 23.

Figure 2:
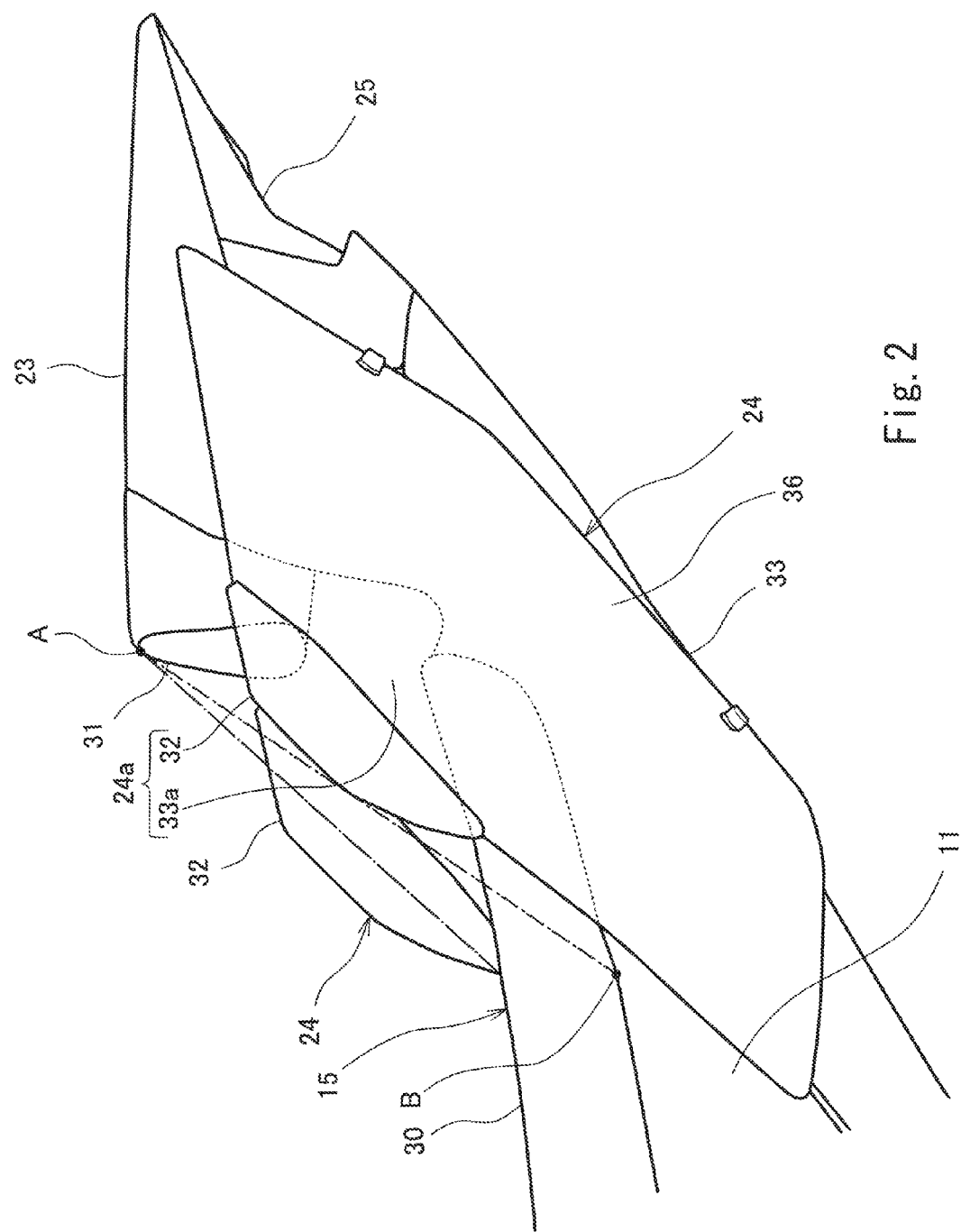
FIG. 2 is a left side view showing a seat, rear side cowlings, and the like of the motorcycle of FIG. 1.

FIG. 2 is a left side view showing the seat 15, the rear side cowlings 24, and the like of the motorcycle 1. As shown in FIG. 2, the rear side cowlings 24 are placed on the right and left sides of the seat 15 and mounted to the seat rails 11, respectively. When viewed from the side, the rear side cowlings 24 include protruding sections 24a, respectively, which protrude farther upward than the seat section 30.

Each of the rear side cowlings 24 includes a cowling body 33 mounted to the seat rail 11, and a side cushion 32 attached to the front edge of the cowling body 33. When viewed from the side, the cowling body 33 has a blade shape extending obliquely upward and rearward. The front end portion of each of the protruding sections 24a, which is located above the set section 30, is flexible. The protruding section 24a of the rear side cowling 24 includes a support portion 33a of the cowling body 33 which is located above the seat section 30 and in front of the rear cushion 31, and the side cushion 32 attached to the front edge of the support portion 33a, the front edge being inclined obliquely upward and rearward. The side cushion 32 protrudes upward and forward from the cowling body 33. In the present embodiment, the side cushion 32 is formed by a cushion member that is flexible. The term "flexible" is defined as having resiliency or a cushioning characteristic, which allows the side cushion 32 to function as the seat.

In the present embodiment, the rear cushion 31 is placed behind and above the seat section 30 and is provided on the front surface of the rear cowling 23. The rear cowling 23 is placed rearward relative to the rear cushion 31 in such a manner the upper surface of the rear cushion 31 and the upper surface of the rear cowling 23 are continuous with each other. The rear cushion 31 serves to support the rider's buttocks from the rear. The rear cushion 31 and the side cushions 32 have a lower resiliency such that the rear cushion 31 and the side cushions 32 are stiffer than the seat section 30.

Figure 3:
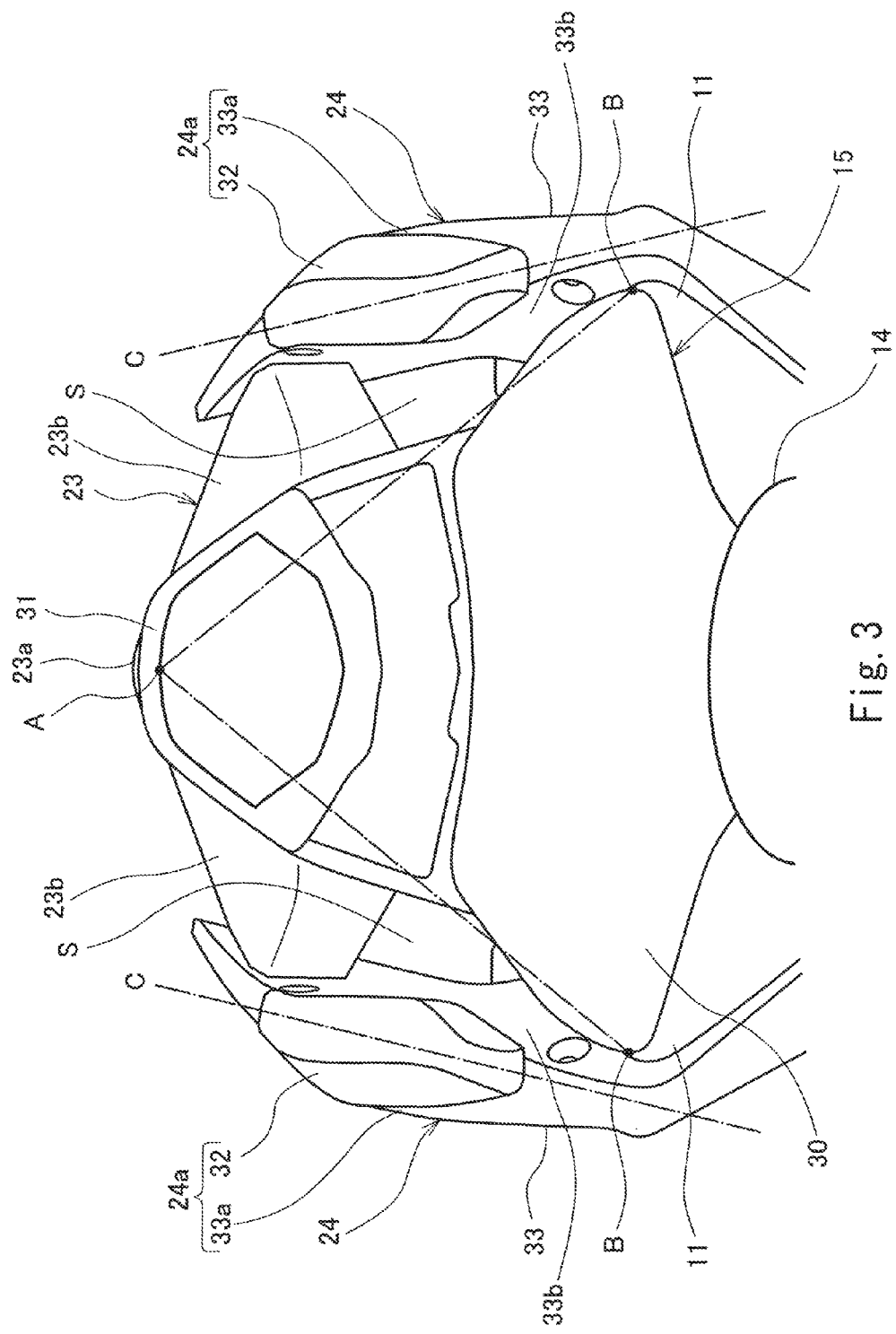
FIG. 3 is a front view showing the seat, the rear side cowlings, and the like of the motorcycle of FIG. 1.

FIG. 3 is a front view showing the seat 15, the rear side cowlings 24, and the like of the motorcycle 1. As shown in FIG. 3, the rear cowling 23 includes a body section 23a provided with the rear cushion 31 on a front surface thereof, and swelling sections 23b protruding to the right and the left, respectively, from the upper portion of the body section 23a. Since the rear side cowlings 24 are fastened to the swelling sections 23b, respectively, protruding to the right and the left, from the upper portion of the body section 23a, a gap (space) is formed between the rear cowling 23 and each of the rear side cowlings 24, at a location that is below the swelling section 23b. In other words, the protruding sections 24a of the rear side cowlings 24 are placed to be spaced apart in the rightward and leftward direction from the rear cushion 31 provided at the rear cowling 23. Between the rear cushion 31 of the rear cowling 23 and the protruding sections 24a of the rear side cowlings 24, right and left spaces S extending in the forward and rearward direction are formed.

In the present embodiment, the right and left rear side cowlings 24 are configured in such a manner that ridge lines (edge lines) (right and left two-dotted lines C of FIG. 3) of the top portions of the side cushions 32 extend in the forward and rearward direction and inner side surfaces 33b of the cowling bodies 33 are inclined in an inward direction of the vehicle width direction relative to the top portions, respectively. The upper surface of each of the side cushions 32 has a shape in which a dimension in the vehicle width direction is reduced from an intermediate portion toward a front portion, and is continuous with the upper surface of the cowling body 33.

Figure 4:
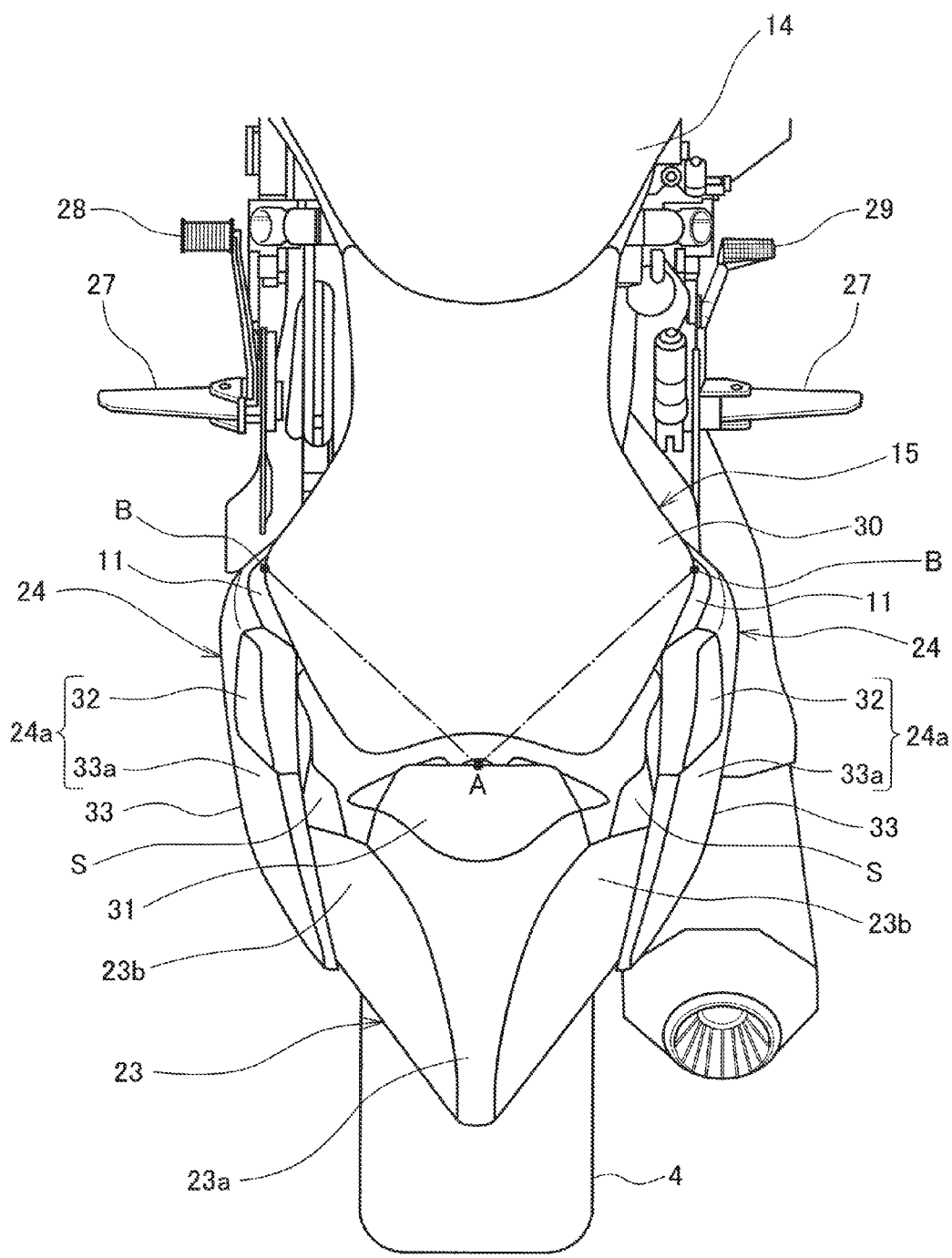
FIG. 4 is a plan view showing the seat, the rear side cowlings, and the like of the motorcycle of FIG. 1.

FIG. 4 is a plan view showing the seat 15, the rear side cowlings 24, and the like of the motorcycle 1. As shown in FIG. 4, the seat section 30 of the seat 15 has a shape in which its rear portion has a width greater than that of its front portion, when viewed from above. The rear portion of the seat section 30 has a shape in which a dimension in the vehicle width direction is reduced as the rear portion of the seat section 30 extends in a rearward direction. The right and left rear side cowlings 24 are located rearward relative to the greatest-width portion of the seat section 30, which is defined by the right and left ends indicated by B. The protruding sections 24a of the rear side cowlings 24 are located rearward relative to the seat section 30. To be precise, the protruding sections 24a are located rearward relative to the rear portion of the seat section 30, the rear portion having a shape in which the dimension is reduced in the rearward direction. The protruding sections 24a have portions which are located inward in the vehicle width direction relative to the outermost portions of the seat section 30 in the vehicle width direction, respectively. The rider's buttocks is located in the rear portion of the seat section 30 having a great area. The rider's feet are located on the right and left sides of the front portion of the seat 15. A shift pedal 28 and a foot rest 27 are provided on the left side of the front portion of the seat 15. A brake pedal 29 and the foot step 27 are provided on the right side of the front portion of the seat 15.

The spaces S formed between the rear cushion 31 of the rear cowling 23 and the protruding sections 24a of the rear side cowlings 24 extend in a vertical direction, as well as in the forward and rearward direction. The rear cushion 31 is separate from the side cushions 32, and spaced apart from the side cushions 32 in the vehicle width direction. The side cushions 32 extend in an inward direction of the vehicle width direction, from at least the front end portions of the protruding sections 24a, respectively. The side cushions 32 are placed inward in the vehicle width direction relative to the outermost portions of the rear side cowlings 24, respectively. The rear portions of the body sections 33 of the rear side cowlings 24 have a streamlined shape, and rear ends thereof are continuous with the side surfaces of the body section 23a of the rear cowling 23. The rear portion of the vehicle body of the motorcycle 1 has a shape in which its dimension is reduced in the rearward direction, when viewed from above.

Figure 5:
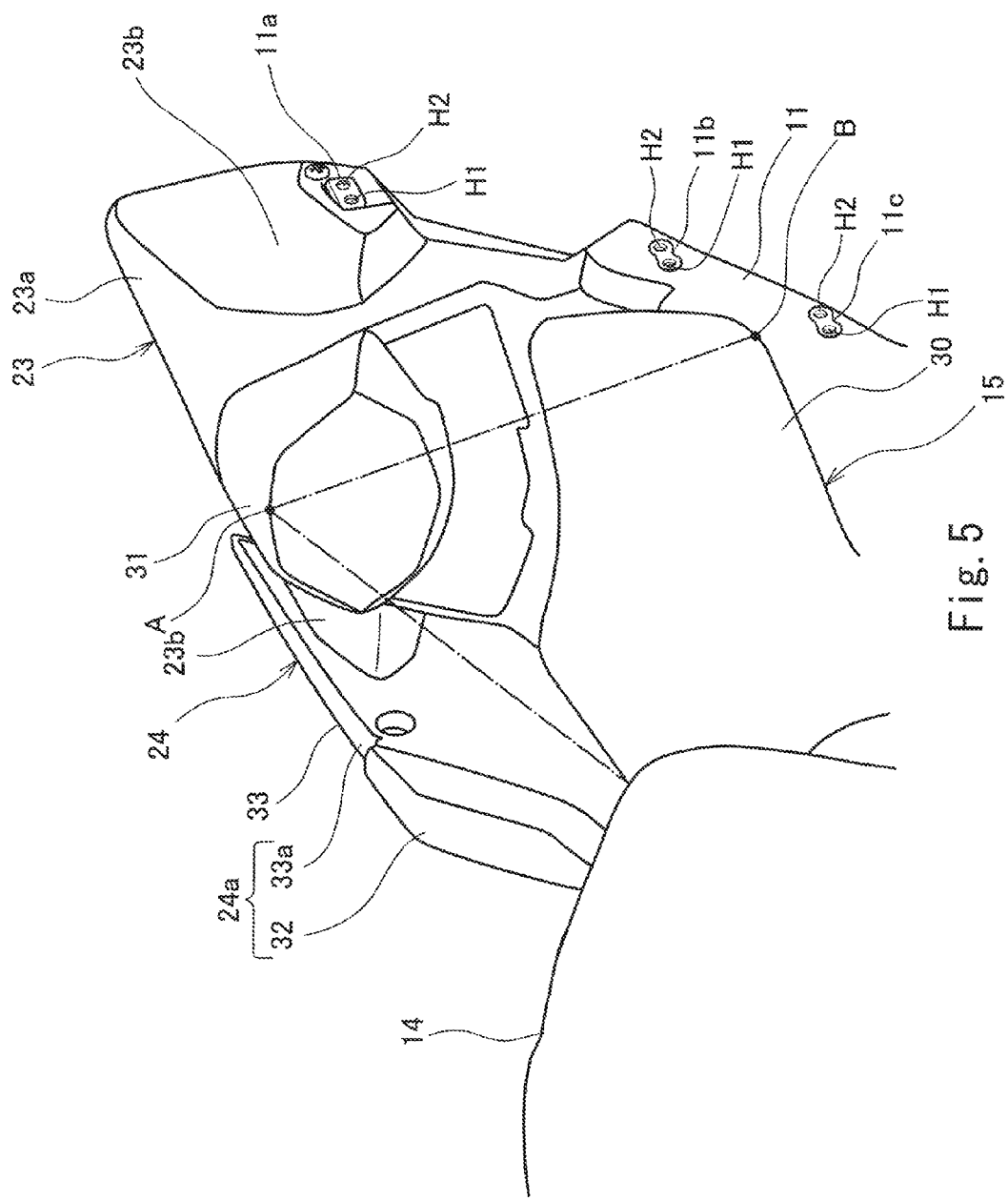
FIG. 5 is a perspective view of major components in a state in which a left rear side cowling is detached from a vehicle body.

FIG. 5 is a perspective view of major components in a state in which the left rear side cowling 24 is detached from the vehicle body. As shown in FIGS. 2 and 5, the protruding sections 24a each including the side cushion 32 and the support section 33a are located below and rearward relative to straight lines (one-dotted lines of FIGS. 2 and 5) connecting the upper portion front end A of the rear cushion 31 to the right and left ends B of the greatest-width portion. The protruding sections 24a are placed in front of the rear cushion 31 and located lower than the rear cushion 31. In the present embodiment, the side cushions 32 are located below the upper surface (point A of FIGS. 2 and 5) of the rear cowling 23 and are inclined in the upward direction and the rearward direction. A boundary line between the front edge of each of the cowling bodies 33 and the bottom portion of the corresponding side cushion 32 extends in a straight-line shape and is inclined in the upward direction as the boundary line extends in the rearward direction. The front end of the boundary line is set to a height position that is in the vicinity of the upper surface of the seat. The rear end of the boundary line is set to a position that is lower than the upper surface of the rear cushion 31.

Next, the mounting structure of the rear side cowling 24 will be described. Each of the rear side cowlings 24 has a structure for allowing the rear side cowling 24 to be detachably mounted to the corresponding seat rail 11. As shown in FIG. 5, the side surface of each of the seat rails 11 in the vehicle width direction is provided with three mounting regions 11a, 11b, 11c. In a state in which the rear side cowling 24 is detached from the seat rail 11, the mounting regions 11a, 11b, 11c provided on the seat rail 11 are exposed outside in the vehicle width direction. The mounting region 11a is provided on the outer side portion in the vehicle width direction, of the seat rail 11 located at the side surface of the swelling section 23b protruding to the right or the left, from the upper portion of the rear cowling body 23a. The mounting region 11b is provided on the outer side portion in the vehicle width direction, of a portion of the seat rail 11, the portion being located rearward relative to the greatest-width portion B of the seat section 30. The mounting region 11c is provided on the outer side portion in the vehicle width direction, of a portion of the seat rail 11, the portion being located in front of the greatest-width portion B of the seat section 30.

The mounting region 11a located on the rear portion of the seat rail 11 is formed with two mounting holes H1, H2. One end portion of a bracket 35 is fastened to one of the mounting holes H1, H2 of the mounting region 11a, by use of a fastener member (e.g., a bolt). The mounting region 11b located on the intermediate portion of the seat rail 11 is formed with two mounting holes H1, H2. The other end portion of the bracket 35 is fastened to one of the mounting holes H1, H2 of the mounting region 11b, by use of a fastener member (e.g., a bolt). The mounting region 11c located on the front portion of the seat rail 11 is formed with two mounting holes H1, H2. The body (not shown) of the rear side cowling 24 is fastened to one of the mounting holes H1, H2 of the mounting region 11c, by use of a fastener member (e.g., a bolt). The mounting holes H1, H2 of each of the mounting regions 11a, 11b, 11c are arranged in parallel in the forward and rearward direction.

By suitably selecting the front hole H1 or the rear hole H2 formed in each of the mounting regions 11a, 11b, 11c, the rear side cowling 24 can be mounted to the seat rail 11 in such a manner that the position of the rear side cowling 24 in the forward and rearward direction, with respect to the seat 15, is variable. In other words, the position of the rear side cowling 24 in the forward and rearward direction is variable, while maintaining the angle of the rear side cowling 24 with respect to the traveling direction of the motorcycle 1.

Figure 6:
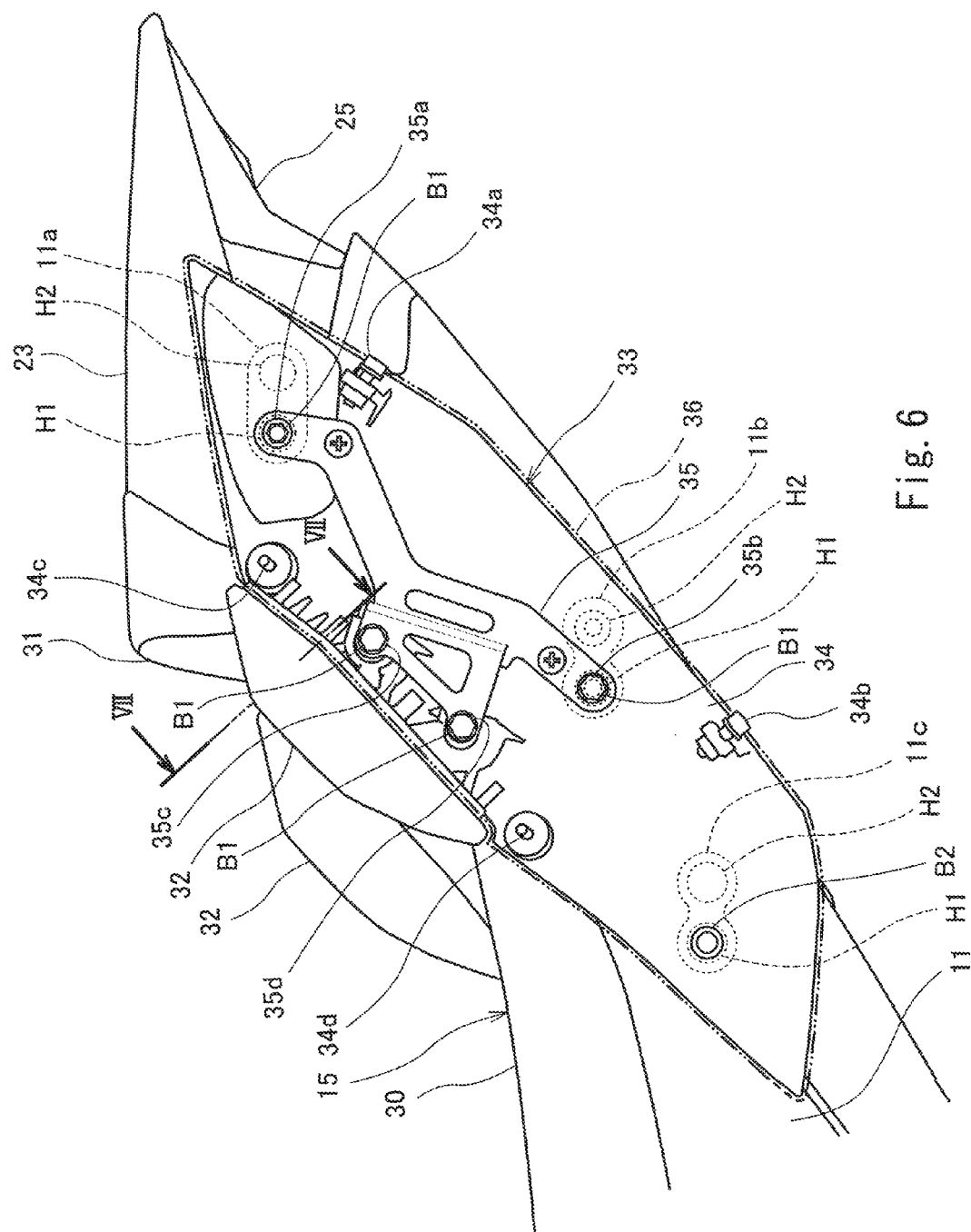
FIG. 6 is a side view of the major components showing a state in which a portion of the left rear side cowling is mounted to a seat rail, when viewed from the left.

FIG. 6 is a side view of the major components showing a state in which a portion of the left rear side cowling 24 is mounted to the seat rail 11, when viewed from the left. As shown in FIG. 6, the cowling body 33 includes an inner plate member 34 made of a resin, an outer plate member 36 (FIG. 2) which is made of a resin and mounted to the outer side portion of the inner plate member 34 in the vehicle width direction, and the bracket 35 which is made of metal and accommodated in a hollow space defined by the inner plate member 34 and the outer plate member 36. The bracket 35 has a thin plate shape conforming to the shape of the cowling body 33. The bracket 35 is formed with mounting holes 35a, 35b, 35c, 35d. A fastener member B1 (e.g., a bolt or a screw) inserted into the mounting hole 35a of the bracket 35 penetrates the inner plate member 34 and is fastened to the mounting hole H1 of the mounting region 11a of the seat rail 11. The fastener member B1 inserted into the mounting hole 35b of the bracket 35 penetrates the inner plate member 34 and is fastened to the mounting hole H1 of the mounting region 11b of the seat rail 11. In this way, the inner plate member 34 is fastened to the seat rail 11. In contrast, the tip end of the inner plate member 34 is directly fastened to the mounting hole H1 of the mounting region 11c of the seat rail 11 by use of a fastener member B2. The bracket 35 is fastened to the inner plate member 34 by use of the fastener members B1 inserted into the mounting holes 35c, 35d, respectively.

The bottom portion of the inner plate member 34 is fastened to the bottom portion of the outer plate member 36 from below, by use of fastener members 34a, 34b. The upper portion of the inner plate member 34 is fastened to the upper portion of the outer plate member 36 from inside the seat 15, by use of fastener members 34c, 34d. In this way, the inner plate member 34 and the outer plate member 36 are firmly fastened to each other by use of the four fastener members 34a to 34d which are located on an upper side and a lower side.

FIG. 7 is a cross-sectional view of the upper portion of the left rear side cowling 24, taken along line VII-VII of FIG. 6. As shown in FIG. 7, the bottom portion of the side cushion 32 of the upper portion of each of the rear side cowlings 24 is formed with rod-like portions 32a protruding downward. The rod-like portions 32a of the side cushion 32 are inserted into holes 34e provided on the upper surface of the inner plate member 34. Since the side cushion 32 is made of a flexible material (e.g., rubber, urethane, or the like), the rod-like portions 32a can be easily inserted into the holes 34e, respectively. Each of the intermediate portions of the rod-like portions 32a has a diameter greater than that of the hole 34e. The intermediate portions of the rod-like portions 32a serve as stoppers which prevent the rod-like portions 32a from being disengaged from the holes 34e, in a state in which the rod-like portions 32a are inserted into the holes 34e, respectively.

The inner plate member 34 is fastened to the bracket 35 by use of the fastener member B1, in an inner space formed by the outer plate member 36 of the cowling body 33.

Next, the posture of the rider straddling the motorcycle 1 will be described with reference to FIG. 1. As shown in FIG. 1, the rider (two-dotted line) is seated on the seat 15 in a straddle posture, and grips the handle 7 with right and left hands. The rider seated on the seat section 30 of the seat 15, places their buttocks on the greatest-width region B provided at the rear portion of the seat section 30, and puts their right and left feet on the right and left foot rests 27 which are in the vicinity of the shift pedal located on the front side of the seat 15. While the motorcycle 1 is traveling, the rider's buttocks are held by the rear side cowlings 24 according to the posture of the rider straddling the motorcycle 1. While the motorcycle 1 is traveling at a high speed, the rider is more inclined in the forward direction, and their buttocks are located closer to the rear end of the vehicle body. In this situation, their buttocks are supported by the rear cushion 31, and the area of the buttocks supported by the rear side cowlings 24 is increased. In this way, the rider's buttocks can be supported reliably at three points which are the right and left side cushions 32 and the rear cushion 31. Further, the rider can change the positions of the rear side cowlings 24 in the forward and rearward direction, according to the body constitution or riding posture of the rider.

In accordance with the above-described configuration, since the rear side cowlings 24 are provided with the protruding sections 24a, respectively, protruding farther upward than the seat section 30, on the right and left sides of the seat 15, the dimension of the protruding sections 24a in the rightward and leftward direction, can be increased while preventing an increase in the width of the vehicle body. Thus, the rider seated on the seat section 30 can be supported at an improved level.

Since the upper portions (side cushions 32) of the protruding sections 24a are flexible, manufacturing cost can be reduced, and the protruding sections 24a can be more easily adapted to the body constitution and posture of the rider, compared to a case where the whole of the protruding sections 24a are flexible.

The seat 15 includes the rear cushion 31 placed behind the seat section 30. The protruding sections 24a are placed to be spaced apart from the rear cushion 31 in the rightward and leftward direction. In this configuration, the rider's buttocks can be supported from the rear at three points which are the rear cushion 31 and the right and left side cushions 32. Thus, the rider's buttocks can be supported at an improved level. Also, since the area of the cushions can be reduced compared to a case where the rider is supported by the whole of the seat, manufacturing cost can be reduced. Further, since the rear portion of the rider's buttocks can be supported at three points, the area of a portion of the buttocks which contacts each of the rear cushion 31 and the right and left side cushions 32 can be reduced.

Since the spaces S extending in the forward and rearward direction are formed between the protruding sections 24a and the rear cushion 31, the weight of the motorcycle 1 can be reduced, and air resistance can be reduced, because the air flows through the spaces S. Further, since the air flows well through the interior of the seat 15, the rider can drive the motorcycle 1 comfortably in the case of a long driving time.

The upper surface of each of the protruding sections 24a is inclined in the upward direction as the upper surface extends in the rearward direction, and each of the protruding sections 24a is placed in front of the rear cushion 31 and located lower than the lower end of the rear cushion 31. In this structure, the rider's buttocks can be easily supported at three points which are the rear cushion 31 and the right and left side cushions 32. In addition, it becomes possible to prevent the rider's buttocks from being overly supported.

Since the positions in the forward and rearward direction of the rear side cowlings 24 including the protruding sections 24a are adjustable, the rear side cowlings 24 can be easily adapted to the body constitution and riding posture of the rider. Since the positions of the rear side cowlings 24 in the forward and rearward direction are variable while maintaining the postures of the rear side cowlings 24, the aerodynamic characteristics (fairing function) of the rear side cowlings 24 can be suitably obtained, even when the positions of the rear side cowlings 24 are changed.

Since the rear side cowlings 24 are detachably mounted to the seat rails 11, respectively, a plurality of rear side cowlings 24 provided with the protruding sections 24a, corresponding to various body constitutions of the rider, may be prepared. The rear side cowling 24 can be suitably selected from these rear side cowlings 24, according to the body constitution, driving posture, and taste of the rider. The rear side cowlings 24 can be changed (replaced) in a state in which the rear cowling 23 is mounted to the vehicle body. Further, in a case where the side cushion 32 is degraded, or the rear side cowling 24 is damaged, and members are changed, the members to be changed can be reduced, and the cost of changing can be reduced, compared to a case where the seat section 30 is integrated with the side cushions 32, or the rear cowling 23 and the rear side cowlings 24 are integrated.

Since the rear cushion 31 and the side cushions 32 have a low resilient characteristic in which the rear cushion 31 and the side cushions 32 are harder than the seat section 30 is, the side surface and back surface of the seat 15 can hold the rider's buttocks better.

The side cushions 32 are located below and rearward relative to the straight lines, respectively, connecting the upper portion front end A of the rear cushion 31 to the right and left ends B of the greatest-width portion of the seat. Therefore, in a case where the rider shifts the center of gravity to the right or the left, while the motorcycle 1 is cornering, the side cowlings 24 do not impede the smooth shifting of the weight of the body of the rider.

The ridge (edge) lines (the right and left two-dotted lines C of FIG. 4) of the top portions of the right and left side cowlings 24 extend in the forward and rearward direction, and the inner side surfaces 33b of the cowling bodies 33 are inclined in the downward direction relative to the top portions, respectively, as the inner side surfaces 33b extend in the inward direction of the vehicle width direction. In this structure, the rider's buttocks can be easily supported.

The upper surface of each of the side cushions 32 has a shape in which a dimension in the vehicle width direction is reduced, from the intermediate portion of the upper surface toward the front portion of the upper surface, and is continuous with the upper surface of the cowling body 33. In this structure, the aerodynamic characteristics of the rear side cowlings 24 can work effectively.

Since the rear portion of the body section 33 of each of the rear side cowlings 24 has a streamlined shape and its rear end is continuous with the body section 23a of the rear cowling 23, the air flowing along the rear portion of the vehicle body of the motorcycle 1 can be faired and an air resistance can be reduced.

Other Embodiments

Although in the present embodiment, the side cushions 32 include the mounting structures for allowing the positions of the side cushions 32 in the forward and rearward direction to be adjustable, the present invention is not limited to this configuration. For example, the side cushions 32 may have mounting structures, respectively, for allowing the positions of the side cushions 32 in the vertical direction to be adjustable, or the positions of the side cushions 32 in the forward and rearward direction and the vertical direction to be adjustable.

Although in the present embodiment, the protruding sections 24a of the rear side cowlings 24 include the side cushions 32, respectively, the protruding sections 24a may consist of the support sections 33a, respectively, without including the side cushions 32.

Although in the above-described embodiment, the motorcycle has been described, the present invention is applicable to straddle-type vehicles different from the motorcycle. For example, the present invention is applicable to three-wheeled or four-wheeled vehicles such as an electric two-wheeled motor vehicle and an ATV (all-terrain vehicle).

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively used in a seat structure of a straddle-type vehicle such as a motorcycle.

LIST OF REFERENCE CHARACTERS 1 motorcycle (straddle-type vehicle)
2 vehicle body frame
3 front wheel
4 rear wheel
15 riding seat
20 front cowling
21 side cowling
23 rear cowling
24 rear side cowling
24a protruding section
30 seat section
31 rear cushion
32 side cushion

The invention claimed is:

1. A straddle vehicle, comprising:
a vehicle body frame;
a seat mounted to the vehicle body frame and including a seat section configured for a rider to be seated thereon; and
a pair of rear side cowlings which are placed on right and left sides of the seat, respectively, and mounted to the vehicle body frame, the pair of rear side cowlings including protruding sections, respectively, protruding farther upward than the seat section, when viewed from a side,
wherein the upper portions of the protruding sections are flexible,
wherein the seat includes a rear cushion placed behind the seat section, and
wherein the protruding sections are placed to be spaced apart from the rear cushion in a rightward and leftward direction.

2. The straddle vehicle according to claim 1,
wherein a space extending in a forward and rearward direction is formed between each of the protruding sections and the rear cushion.

3. The straddle vehicle according to claim 1,
wherein an upper surface of each of the protruding sections is inclined in an upward direction as the upper surface extends in a rearward direction and each of the protruding sections is placed in front of the rear cushion and located lower than a lower end of the rear cushion.

4. A straddle vehicle, comprising:
a vehicle body frame;
a seat mounted to the vehicle body frame and including a seat section configured for a rider to be seated thereon; and
a pair of rear side cowlings which are placed on right and left sides of the seat, respectively, and mounted to the vehicle body frame, the pair of rear side cowlings including protruding sections, respectively, protruding farther upward than the seat section, when viewed from a side,
wherein a position of each of the protruding sections in a forward and rearward direction is adjustable.

* * * * *